US007085593B2

(12) United States Patent
Anderton

(10) Patent No.: US 7,085,593 B2
(45) Date of Patent: Aug. 1, 2006

(54) SEMICONDUCTOR CHIP AND A MOBILE TELEPHONE INCLUDING SAID SEMICONDUCTOR CHIP

(75) Inventor: John Anderton, Livingston (GB)

(73) Assignee: Seiko Epson Corporation, Tokyo (JP)

(*) Notice: Subject to any disclaimer, the term of this patent is extended or adjusted under 35 U.S.C. 154(b) by 4 days.

(21) Appl. No.: 10/488,868

(22) PCT Filed: Aug. 7, 2003

(86) PCT No.: PCT/GB03/03458

§ 371 (c)(1),
(2), (4) Date: Jul. 15, 2004

(87) PCT Pub. No.: WO2004/017298

PCT Pub. Date: Feb. 26, 2004

(65) Prior Publication Data

US 2005/0043005 A1 Feb. 24, 2005

(30) Foreign Application Priority Data

Aug. 15, 2002 (GB) ................................ 0219039.5

(51) Int. Cl.
*H04B 1/38* (2006.01)
*H04M 1/00* (2006.01)

(52) U.S. Cl. ................ 455/566; 455/556.1; 455/569.1; 455/572; 455/573; 345/690; 345/696; 345/698

(58) Field of Classification Search ............. 455/556.1, 455/566, 569.1, 572, 573; 345/204, 690, 345/696, 698

See application file for complete search history.

(56) References Cited

U.S. PATENT DOCUMENTS

| | | | | |
|---|---|---|---|---|
| 5,406,305 | A | 4/1995 | Shimomura et al. | |
| 5,493,685 | A | 2/1996 | Zenda | |
| 5,964,847 | A | 10/1999 | Booth, III et al. | |
| 6,078,302 | A | 6/2000 | Suzuki | |
| 6,233,467 | B1 | 5/2001 | Rydbeck | |
| 6,385,466 | B1 | 5/2002 | Hirai et al. | |
| 6,831,662 | B1 * | 12/2004 | Lum et al. | 345/698 |
| 2001/0013854 | A1 | 8/2001 | Ogoro | |
| 2001/0052887 | A1 * | 12/2001 | Tsutsui et al. | 345/87 |
| 2003/0220937 | A1 * | 11/2003 | Maeoka et al. | 707/104.1 |
| 2004/0225661 | A1 * | 11/2004 | Takayanagi | 707/10 |

FOREIGN PATENT DOCUMENTS

| | | | |
|---|---|---|---|
| EP | 0 464 552 | A2 | 1/1992 |
| EP | 0 707 301 | A1 | 4/1996 |
| GB | 2365691 | A | 2/2002 |
| WO | WO 99/53472 | | 10/1999 |

* cited by examiner

*Primary Examiner*—Doris H. To
*Assistant Examiner*—Tuan Pham
(74) *Attorney, Agent, or Firm*—Oliff & Berridge, PLC

(57) ABSTRACT

A mobile telephone 1 including a display screen 3 and a semiconductor chip 5. The semiconductor chip 5 includes control means 7, a receiver 9 and a memory 11. The receiver 9 receives one or more first, second and/or third signals from first, second and third sensors 15, 17 and 19 respectively. When the control means 7 receives a signal from the receiver 9 indicating that the current mode of contrast and/or color is to be changed, the control means 7 selects an associated pre-defined mode of contrast and/or color from the memory 11 in order to optimize the visibility of the display screen 3, subject to the amount of supply voltage available.

9 Claims, 6 Drawing Sheets

SEMICONDUCTOR CHIP AND A MOBILE TELEPHONE INCLUDING SAID SEMICONDUCTOR CHIP

Figure 1:
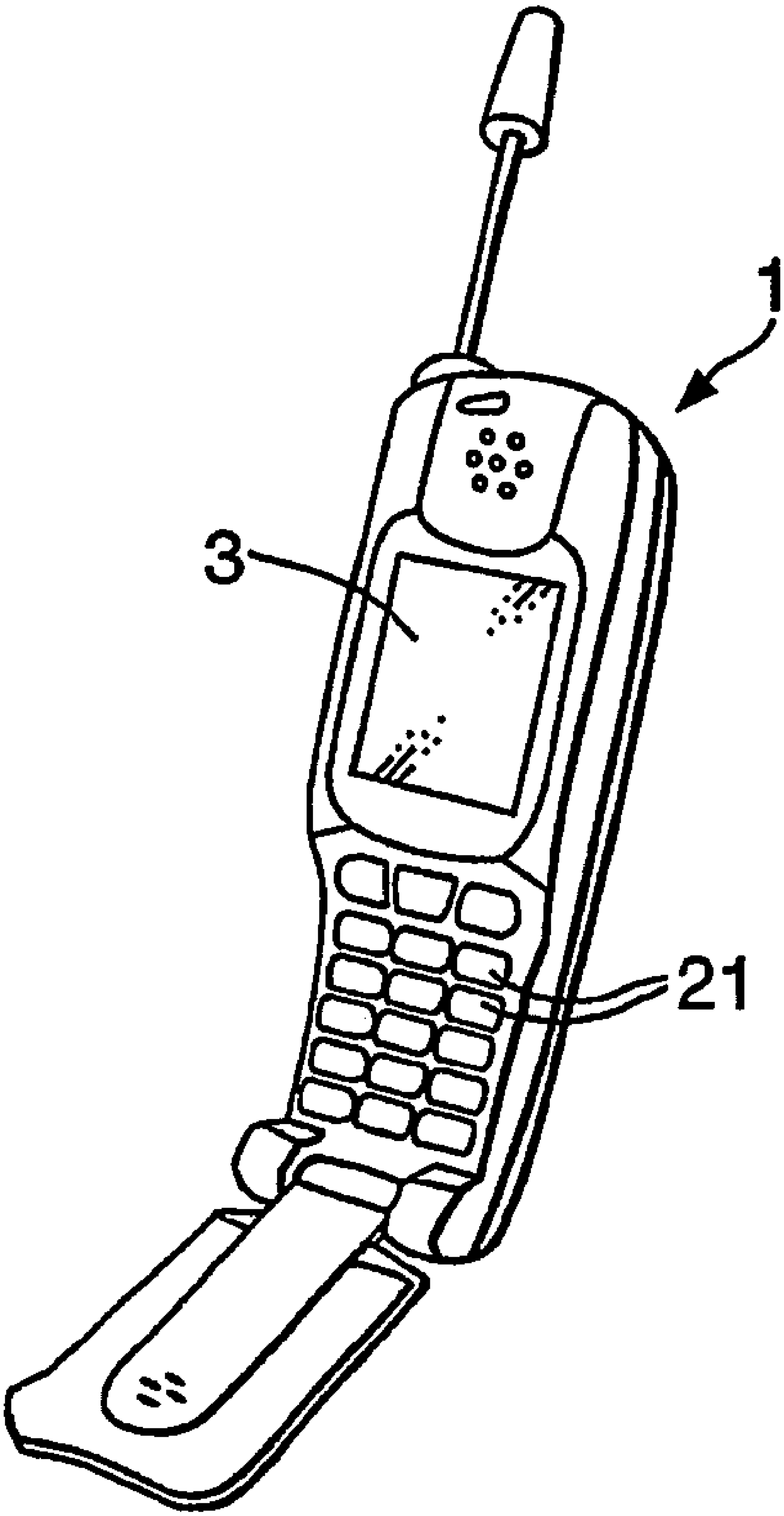

This application relates to a semiconductor chip and a mobile telephone including said semiconductor chip. In particular, the invention relates to the optimisation of the visibility of a display screen suitable for a mobile telephone.

Currently mobile telephones are constrained by the requirements of a small screen and achieving maximum efficiency of the battery. The visibility of the display screen can be optimised when a user can adjust the position of the mobile telephone. However mobile telephones are often used in situations where adjusting the position in such a hand held use is not appropriate. For example, if a user is driving he/she may use a hands-free kit and consequently may not be able to adjust the position of the mobile telephone for optimum visibility. For safety reasons he/she may also be unable to spend the necessary amount of time looking at the mobile telephone in order to assimilate all the essential information they require. Thus use of a hands-free kit requires the mode of operation of the display screen to be changed in order to optimise the visibility of the display screen. Optimising the visibility of the display screen of a mobile telephone for different usage scenarios results in the mobile telephone being easier and potentially safer to use.

Methods of optimising the visibility of the display screen have been discussed and include prior U.S. Pat. No. 6,233,467B1. This US patent discloses a mobile telephone which automatically alters the text displayed on the display screen, to a larger, bolder font size to compensate for situations where poor lighting is likely, such as inside a motor vehicle and/or connected to a hands-free-kit. The mobile telephone has a sensor which detects if an external power supply and/or a hands-free kit has been connected. If an external power supply and/or hands-free kit is detected, the text is adjusted to a larger, bolder font size. One disadvantage to this arrangement is that the font size is constrained by the size of the display screen and the amount of information required to be displayed on the display screen at any given time. Therefore the font size can not be increased beyond a specific size and consequently optimum visibility is not achieved.

Prior U.S. Pat. No. 5,406,305A discloses a display device which automatically controls the luminance of the display screen, in response to a change in intensity of the ambient light, to optimise the visibility of the display screen. One disadvantage to this arrangement is that backlighting drains the power supply quickly, therefore the "life" of a mobile telephone containing the display device is reduced between battery charging and consequently it is frustrating for a user to repeatedly charge the battery.

Finally prior U.S. Pat. No. 5,964,847A discloses a computer which is capable of receiving and recognising a variety of docking options, such as a hands-free kit. The computer does not adjust the display screen to optimise the visibility when a device is docked with the computer.

Accordingly this invention addresses the above problems. This invention relates to a semiconductor chip, coupled to a display screen suitable for a mobile telephone, said semiconductor chip is used to adjust the contrast between, and/or the colour of, the foreground and the background of said display screen, said semiconductor chip comprises: a receiver for receiving one or more of a first, second and/or a third signal indicating that the current mode of contrast and/or colour is to be adjusted, wherein said current mode of contrast and/or colour is the mode of contrast and/or colour which is being displayed on said display screen; and control means, coupled to said receiver for adjusting the current mode of contrast and/or colour.

This invention also relates to a mobile telephone having a display screen coupled to said semiconductor chip as claimed in any one of attached claims 1 to 5.

Figure 2:
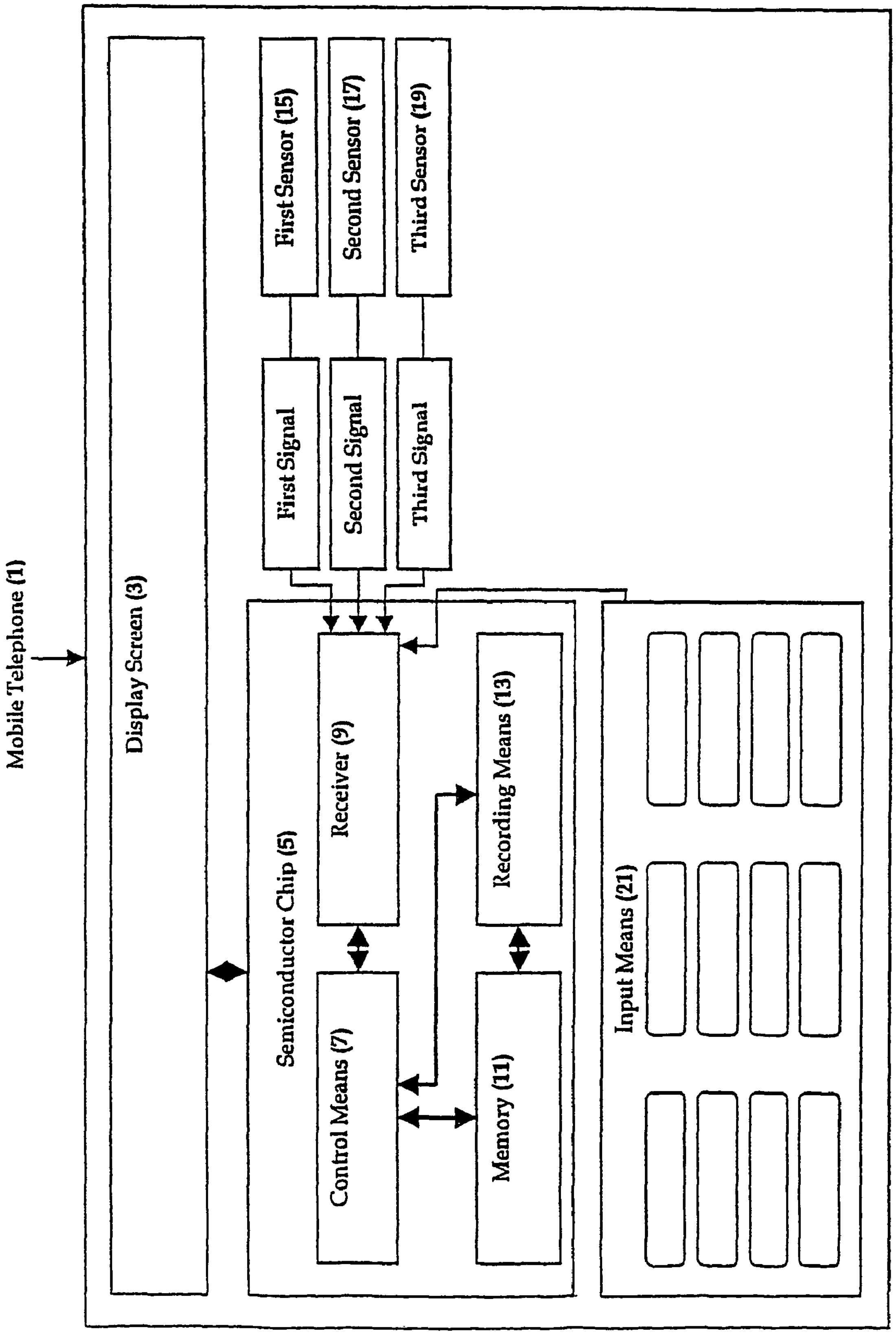
Figure 3:
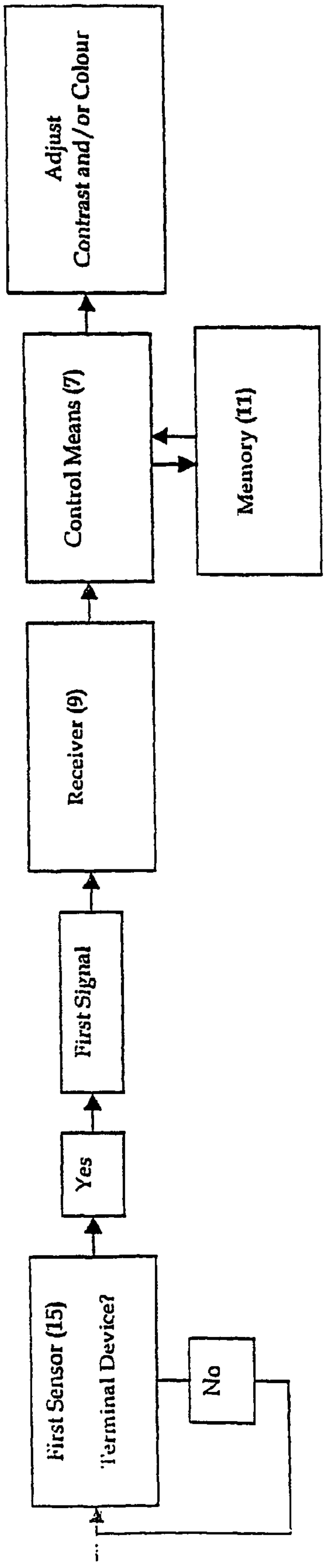
Figure 4:
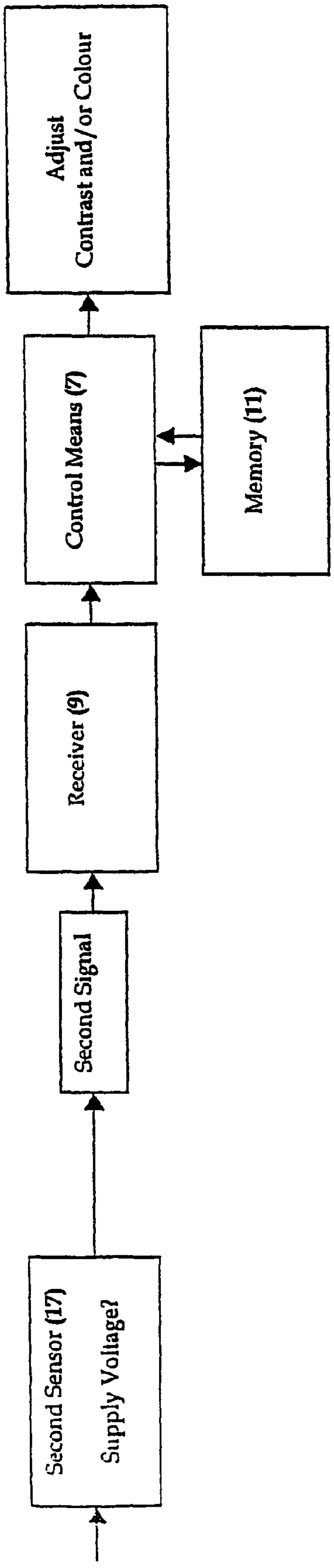
Figure 5:
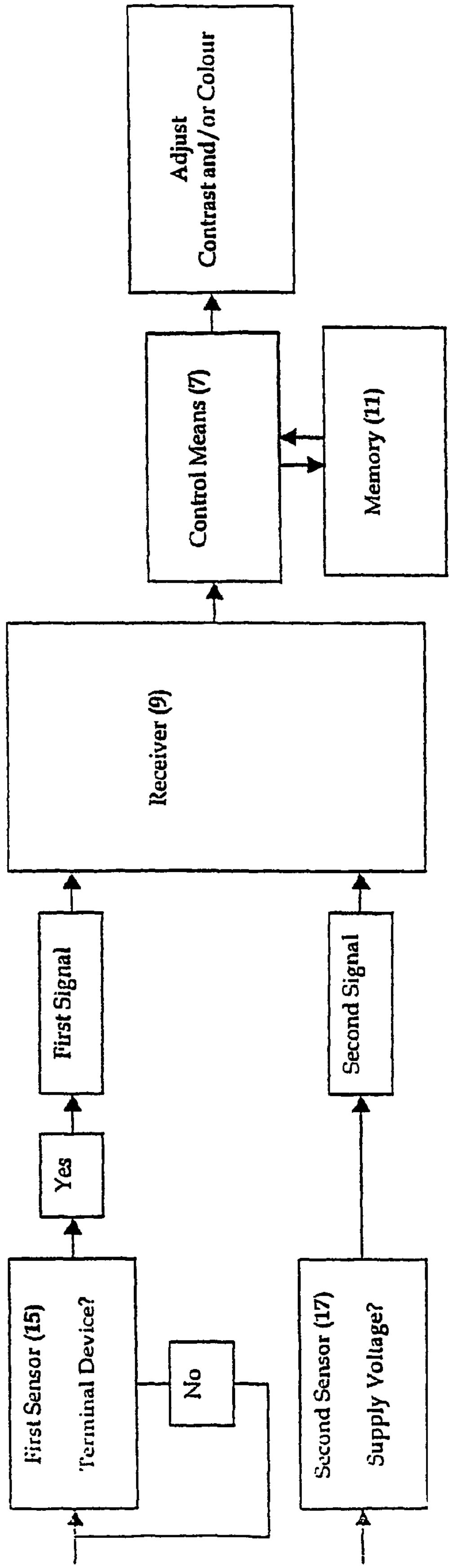
Figure 6:
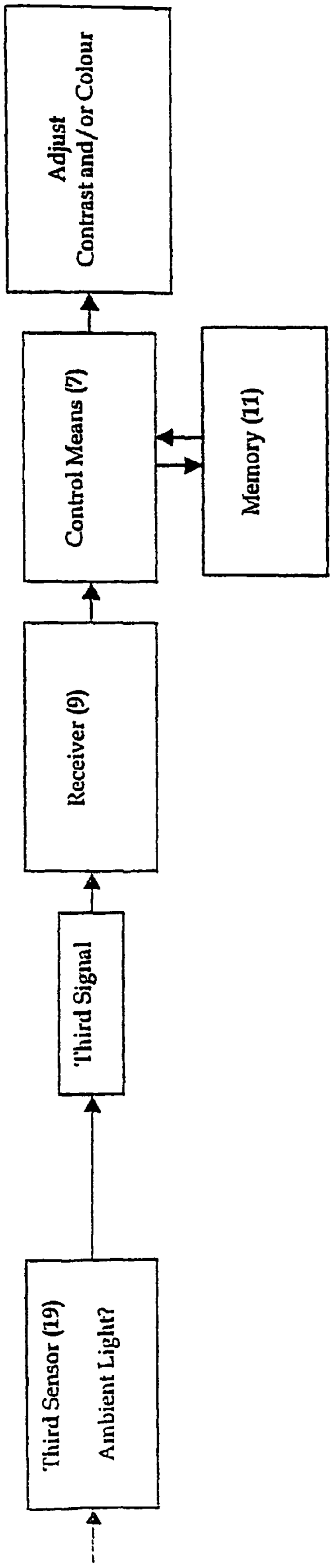
Figure 7:
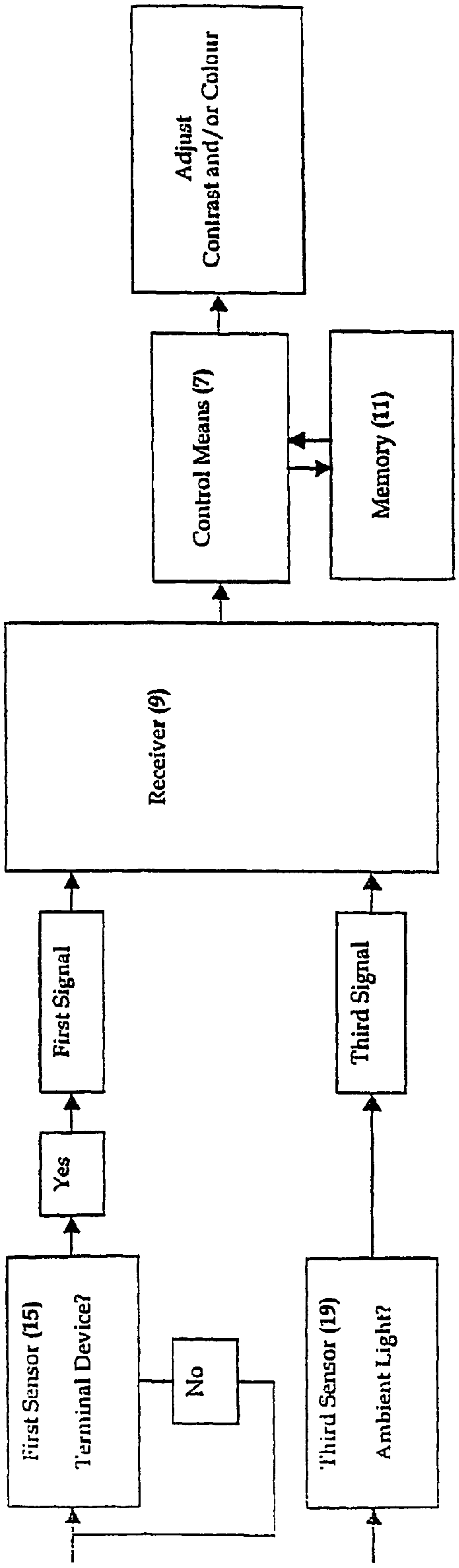
Figure 8:
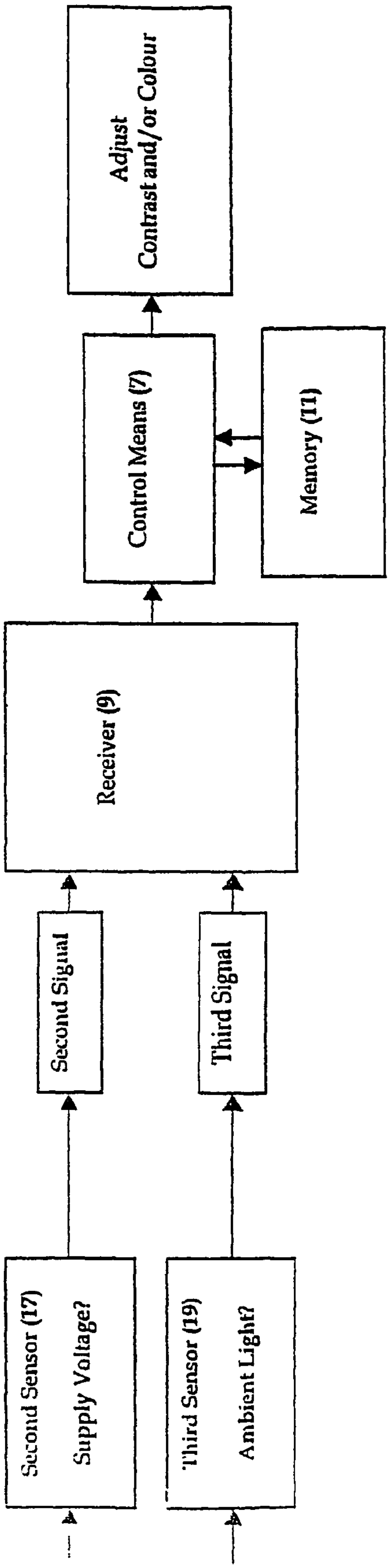
Figure 9:
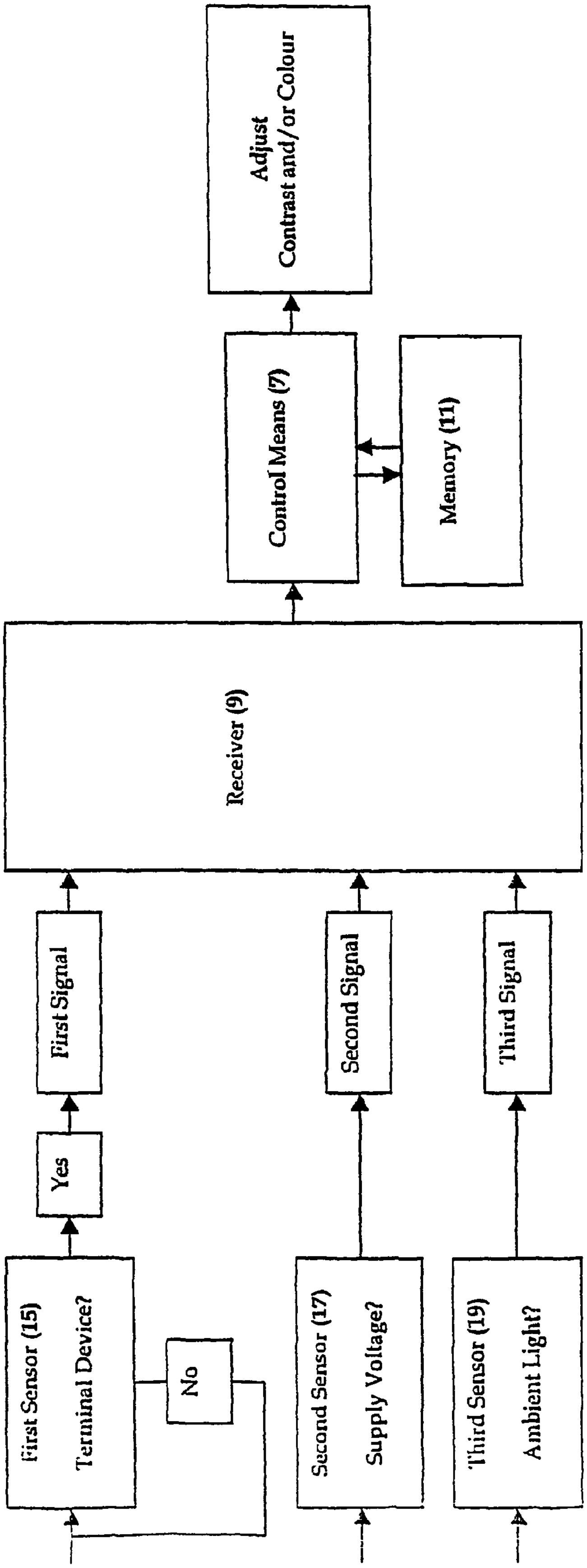

Embodiments of the present invention will now be described by way of further example only and with reference to the accompanying drawings, in which:

FIG. 1—is a perspective view of a typical mobile telephone;

FIG. 2—is a block diagram of a mobile telephone including a semiconductor chip according to this invention;

FIG. 3—is a flow diagram of optimisation of the visibility of a display screen of a mobile telephone including a semiconductor chip and a first sensor according to this invention;

FIG. 4—is a flow diagram of optimisation of the visibility of a display screen of a mobile telephone including a semiconductor chip and a second sensor according to this invention;

FIG. 5—is a flow diagram of optimisation of the visibility of a display screen of a mobile telephone including a semiconductor chip, a first sensor and a second sensor according to this invention;

FIG. 6—is a flow diagram of optimisation of the visibility of a display screen of a mobile telephone including a semiconductor chip and a third sensor according to this invention;

FIG. 7—is a flow diagram of optimisation of the visibility of a display screen of a mobile telephone including a semiconductor chip, a first sensor and a third sensor according to this invention;

FIG. 8—is a flow diagram of optimisation of the visibility of a display screen of a mobile telephone including a semiconductor chip, a second sensor and a third sensor according to this invention; and FIG. 9—is a flow diagram of optimisation of the visibility of a display screen of a mobile telephone including a semiconductor chip, a first sensor, a second sensor and a third sensor according to his invention.

FIG. 1 illustrates a typical mobile telephone 1, including a display screen 3 and input means 21.

FIG. 2 illustrates a block diagram of the mobile telephone 1, including the display screen 3 coupled to a semiconductor chip 5 of this invention. The semiconductor chip 5 includes control means 7, a receiver 9, a memory 11 and recording means 13.

The receiver 9 is coupled to control means 7 and receives first, second and third signals from first, second and third sensors 15, 17 and 19 respectively. The control means 7 decides whether the current mode of contrast between, and/or the colour of, the foreground and the background of the display screen 3 is to be changed upon receipt of a signal from the receiver 9. Alternatively each of the sensors 15, 17 and 19 provides a signal which indicates that the current mode of contrast between, and/or the colour of, the foreground and the background of the display screen 3 is to be changed. The current mode of contrast and/or colour is the mode of contrast and/or colour which is being displayed on the display screen 3. The control means 7 changes the current mode of contrast and/or colour to a pre-defined mode of contrast and/or colour, which is stored in the memory 11, when a signal is received. Each signal is associated with a pre-defined mode of contrast and/or colour.

A range of different pre-defined modes of contrast and/or colour are associated with a signal and stored in the memory 11 of the semiconductor chip 5. Each pre-defined mode of contrast and/or colour is selected for use when its associated signal is received. For example, if the signal received by the receiver 9 indicates that a terminal device is detected, the current mode of contrast and/or colour will be changed to the associated pre-defined mode of contrast and/or colour which increases the visibility of the display screen 3 when the mobile telephone 1 is docked with a terminal device.

The first sensor 15 generates a first signal when the mobile telephone 1 is docked with a terminal device. The steps for adjustment of the display screen 3 as a consequence of using the first sensor 15 are illustrated in FIG. 3.

One example of a terminal device is a hands-free kit, another example is an external power supply. When the receiver 9 receives said first signal indicating that a terminal device is detected, the receiver 9 provides an indication of this to the control means 7. The control means 7 then selects the associated pre-defined mode of contrast and/or colour from the memory 11, and adjusts the current mode of contrast and/or colour of the display screen 3 to the pre-defined mode of contrast and/or colour.

The second sensor 17 generates a second signal indicative of the amount of supply voltage available in the battery of the mobile telephone 1. The steps for adjustment of the display screen 3 as a consequence of using the second sensor 17 are illustrated in FIG. 4.

Mobile telephones have only a limited amount of supply voltage available between each charging of the battery. Each pre-defined mode of contrast and/or colour drains the supply voltage at a different rate, therefore some modes of contrast and/or colour require substantially greater amounts of supply voltage. Consequently it is important that the current mode of contrast and/or colour and the selected associated pre-defined mode of contrast and/or colour do not drain the supply voltage too quickly.

Upon receipt of the second signal from the receiver 9, indicative of the amount of supply voltage available in the battery of the mobile telephone 1, the control means 7 adjusts the current mode of contrast and/or colour to an associated pre-defined mode of contrast and/or colour which will increase the battery efficiency and optimise visibility of the display screen 3. Pre-defined levels of supply voltage are stored in the memory 11 and are associated with pre-defined modes of contrast and/or colour. Thus, for each level of supply voltage a different pre-defined mode of contrast and/or colour is selected, which optimises the visibility of the display screen 3 whilst prolonging the life of the remaining supply voltage. This prevents the supply voltage available from the battery being drained too quickly.

The pre-defined mode of contrast and/or colour selected by the control means 7 is a compromise between providing optimum length of use due to the remaining amount of supply voltage and providing optimum visibility for a user in varying circumstances. Namely the most draining modes of contrast and/or colour will not be selected if there is only a small amount of supply voltage available, thus enabling the battery life of the mobile telephone 1 to be optimised.

The mobile telephone 1 may include the above described first sensor 15, the above described second sensor 17 or both the first sensor 15 and the second sensor 17. The steps for adjustment of the display screen 3 as a consequence of using the first sensor 15 and the second sensor 17 are illustrated in FIG. 5.

When both the first sensor 15 and the second sensor 17 are connected to the mobile telephone 1, the amount of supply voltage available, detected by the second sensor 17, is the dominant signal in the selection of the associated pre-defined mode of contrast and/or colour.

If the terminal device sensed by the first sensor 15 is, for example, a hands-free kit, then the amount of supply voltage available is the dominant signal received by the control means 7 from the receiver 9. As certain pre-defined mode of contrast and/or colour drain the supply voltage quicker than others, the control means 7 selects the associated pre-defined mode of contrast and/or colour for use which will optimise the length of the remaining supply voltage first and then optimise the visibility of the display screen 3. A compromise between providing optimum length of use due to the remaining amount of supply voltage and providing optimum visibility for a user is implemented.

If the terminal device sensed by the first sensor 15 is, for example, an external power supply, then the supply voltage available is a maximum supply voltage. The amount of supply voltage available is still the dominant signal received by the control means 7 form the receiver 9. However because the amount of supply voltage available is the maximum supply voltage, the speed with which certain associated pre-defined modes of contrast and/or colour drain the supply voltage is no longer a consideration and a compromise between the two factors is not required. Therefore the associated pre-defined mode of contrast and/or colour which provides optimum visibility for a user will be selected by the control means 7, regardless of the amount of supply voltage it requires.

The third sensor 19 generates a third signal indicative of the amount of light surrounding the mobile telephone 1. The steps for adjustment of the display screen 3 as a consequence of using the third sensor 19 are illustrated in FIG. 6.

Upon receipt of the third signal from the receiver 9 indicative of the amount of ambient light, the control means 7 adjusts the current mode of contrast and/or colour to an associated pre-defined mode of contrast and/or colour. Pre-defined levels of ambient light are stored in the memory 11 together with associated pre-defined modes of contrast and/or colour. Thus, for each level of ambient light a different pre-defined mode of contrast and/or colour is selected which optimises the visibility of the display screen 3 for a user.

The mobile telephone 1 may include the third sensor 19 combined with the above described first sensor 15, the above described second sensor 17, or both the first sensor 15 and the second sensor 17.

The steps for adjustment of the display screen 3 as a consequence of using the first sensor 15 and the third sensor 19 are illustrated in FIG. 7.

When both the first sensor 15 and the third sensor 19 are connected to the mobile telephone 1, both the first and third signal have equal dominance in the selection of the associated pre-defined mode of contrast and/or colour. Therefore the associated pre-defined mode of contrast and/or colour may be set by the manufacturer or by a user. A compromise between the pre-defined mode of contrast and/or colour associated with the detection of a terminal device and the pre-defined mode of contrast and/or colour associated with the level of ambient light detected is implemented to provide optimum visibility of the display screen 3 for a user.

The steps for adjustment of the display screen 3 as a consequence of using the second sensor 17 and the third sensor 19 are illustrated in FIG. 8.

When both the second sensor 17 and the third sensor 19 are connected to the mobile telephone 1, the amount of supply voltage available, detected by the second sensor 17, is the dominant signal in the selection of the associated pre-defined mode of contrast and/or colour. As certain associated pre-defined modes of contrast and/or colour drain the supply voltage quicker than others, the control means 7 selects the associated pre-defined mode of contrast and/or colour which is a compromise between optimising the length of the remaining supply voltage and optimising the visibility of the display screen 3.

The steps for adjustment of the display screen 3 as a consequence of using the first sensor 15, the second sensor 17 and the third sensor 19 are illustrated in FIG. 9.

When the first sensor 15, the second sensor 17 and the third sensor 19 are connected to the mobile telephone 1, the amount of supply voltage available, detected by the second sensor 17, is the dominant signal in the selection of the associated pre-defined mode of contrast and/or colour.

If the terminal device sensed by the first sensor 15 is, for example, a hands-free kit, then the amount of supply voltage available is the dominant signal received by the control means 7 from the receiver 9. As certain pre-defined modes of contrast and/or colour drain the supply voltage quicker than others, the control means 7 selects the associated pre-defined mode of contrast and/or colour for use which will optimise the length of the remaining supply voltage first and then optimise the visibility of the display screen 3. A compromise between providing optimum length of use due to the remaining amount of supply voltage and providing optimum visibility for a user is implemented.

If the terminal device sensed by the first sensor 15 is, for example, an external power supply, then the amount of supply voltage available is a maximum supply voltage. The amount of supply voltage available, detected by the second sensor 17, is the dominant signal received by the control means 7 from the receiver 9. However because the amount of supply voltage available is the maximum supply voltage, the speed with which certain associated pre-defined modes of contrast and/or colour drain the supply voltage is no longer a consideration and a compromise is not required. Therefore the associated pre-defined mode of contrast and/or colour which provides optimum visibility for a user will be selected by the control means 7.

The combination of the first sensor 15, the second sensor 17 and the third sensor 19, results in the optimum mode of contrast and/or colour being selected by the control means 7 when the mobile telephone 1 is docked with a terminal device and the amount of ambient light and supply voltage are known. The combination of all three sensors 15, 17 and 19 in a mobile telephone 1 is the most advantages of the above described embodiments.

The pre-defined modes of contrast and/or colour, which are held in the memory 11, can be personalised by a user. The input means 21 and the recording means 13 can be used to select different colours from a range of colours held in the memory 11, which the display screen 3 is capable of displaying. A user can select which colour is to be used as the foreground and which is to be used as the background, to create personalised modes of contrast and/or colour.

High visibility colour schemes and very contrasting colours can sometimes cause excess glare and consequently can be fatiguing for a user. Therefore the ability to personalise the modes of contrast and/or colour results in greater satisfaction for a user as individual users may react differently to different modes of contrast and/or colour. These "new" modes of contrast and/or colour are stored in the memory 11 along with the existing pre-defined modes of contrast and/or colour.

A user can specify which of the personalised or pre-defined modes of contrast and/or colour are selected when a first and/or second and/or third signal is received by the receiver 9.

The semiconductor chip 5 of this invention can also be used with a display screen 3 that is capable of displaying more than two colours simultaneously. In this circumstance a user can define more than two colours to be used in each personalised mode of contrast and/or colour, dictating an array of colours not just the foreground and the background colours.

A user can manually enter the first and/or second and/or third signal using the input means 21 to indicate that the current mode of contrast and/or colour is to be changed to the associated pre-defined mode of contrast and/or colour. A user can also manually select which personalised or pre-defined mode of contrast and/or colour is to be the current mode of contrast and/or colour.

The pre-defined modes of contrast and/or colour can be programmed during the manufacture of the semiconductor chip 5 or upon initial power up of the mobile telephone 1.

The semiconductor chip 5 of this invention can be implemented into existing mobile telephones relatively easily with only slight modification required to the software. The semiconductor chip 5 does not require significant new hardware either and therefore the cost of implementation is kept down.

Although the above embodiments have been described in relation to a mobile telephone 1 it is also possible to use the semiconductor chip 5 in other hand held type devices which have a display screen 3 such as an electronic notebook, a digital camera, etc.

The aforegoing description has been given by way of example only and it will be appreciated by a person skilled in the art that modifications can be made without departing from the scope of the present invention.

The invention claimed is:

1. A mobile telephone, comprising:

a display screen;

a semiconductor chip, coupled to the display screen, for adjusting the contrast between, and/or the color of, the foreground and background of said display screen, said semiconductor chip including:

a receiver for receiving one or more of a first, a second and/or a third signal indicating that the current mode of contrast and/or color is to be adjusted, wherein said current mode of contrast and/or color is the mode of contrast and/or color which is being displayed on said display screen; and control means, coupled to said receiver for adjusting the current mode of contrast and/or color; and a first sensor, coupled to said semiconductor chip, for detecting that said mobile telephone is docked with a terminal device and for generating a first signal;

wherein said control means adjusts the current mode of contrast and/or color to an associated pre-defined mode of contrast and/or color to optimize the visibility of said display screen when said terminal device is detected.

2. A mobile telephone as claimed in claim 1, further comprising a memory, coupled to said control means, for storing mode(s) of contrast and/or color which are selected in response to said first and/or second and/or third signal.

3. A mobile telephone as claimed in claim 2, in which there are a number of pre-defined mode(s) of contrast and/or color.

4. A mobile telephone as claimed in claim 3, further comprising recording means, coupled to said control means and said memory, for recording a pre-defined mode(s) of contrast and/or color selected by a user.

5. A mobile telephone as claimed in claim 4, wherein said recording means, further records that each pre-defined mode (s) of contrast and/or color is to be selected in response to an associated first and/or second and/or third signal selected by a user.

6. A mobile telephone as claimed in claim 1, further comprising:

a second sensor, coupled to said semiconductor chip, for determining the supply voltage to said mobile telephone and for generating a second signal indicative of the amount of supply voltage available; and wherein said control means determines if the supply voltage is below a pre-defined level and thereby adjusts the current mode of contrast and/or color to an associated pre-defined mode of contrast and/or color to optimize the visibility of said display screen.

7. A mobile telephone as claimed in claim 6, wherein if said second sensor determines said supply voltage to be a predetermined maximum supply voltage; then said control means adjusts the current mode of contrast and/or color to an optimum mode of contrast and/or color to optimize the visibility of said display screen.

8. A mobile telephone as claimed in claim 1, further comprising: a third sensor coupled to said semiconductor chip for detecting the ambient light and for generating a third signal; and wherein said control means determines if the ambient light falls below a pre-defined level and thereby adjusts the current mode of contrast and/or color to an associated pre-defined mode of contrast and/or color to optimize the visibility of said display screen.

9. A mobile telephone as claimed in claim 1, further comprising means for enabling said user to input said first and/or second and/or third signal.

* * * * *